United States Patent [19]

Drillick

[11] 4,126,257
[45] Nov. 21, 1978

[54] PAPER TAPE PUNCH AND READER

[75] Inventor: Jacob H. Drillick, Glen Rock, N.J.

[73] Assignee: Drillick-LaManna Corporation, Hawthorne, N.J.

[21] Appl. No.: 774,529

[22] Filed: Mar. 4, 1977

[51] Int. Cl.² ........................................... B65H 17/40
[52] U.S. Cl. ..................................... 226/76; 226/156; 234/130
[58] Field of Search ................. 234/130; 226/76, 156, 226/157

[56] References Cited
U.S. PATENT DOCUMENTS 3,181,759  5/1965  Maples .......................... 226/157 X Primary Examiner—J. M. Meister
Attorney, Agent, or Firm—John T. Roberts

[57] ABSTRACT

A combination paper tape punch and reader having a bi-directional stepping tape transport controlled by a continuously oscillating magnetically activated pawl. A further improvement is a punch interposer geometry allowing for easy removal of the punch and die. A single motor and timing signal is used for both punch and reader tape transports.

3 Claims, 10 Drawing Figures

FIG. 8.
FIG. 9.
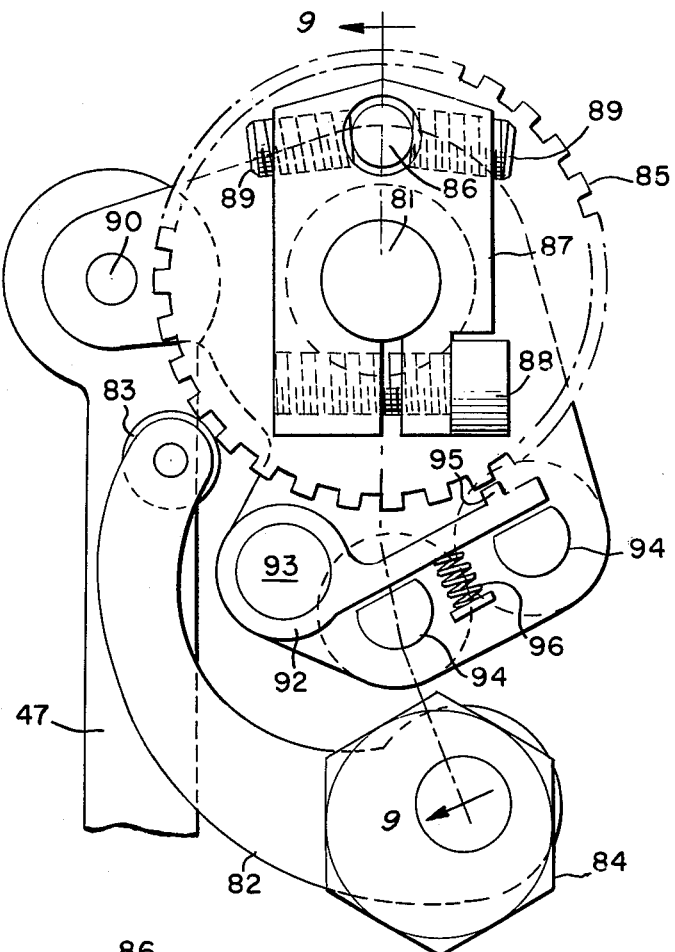
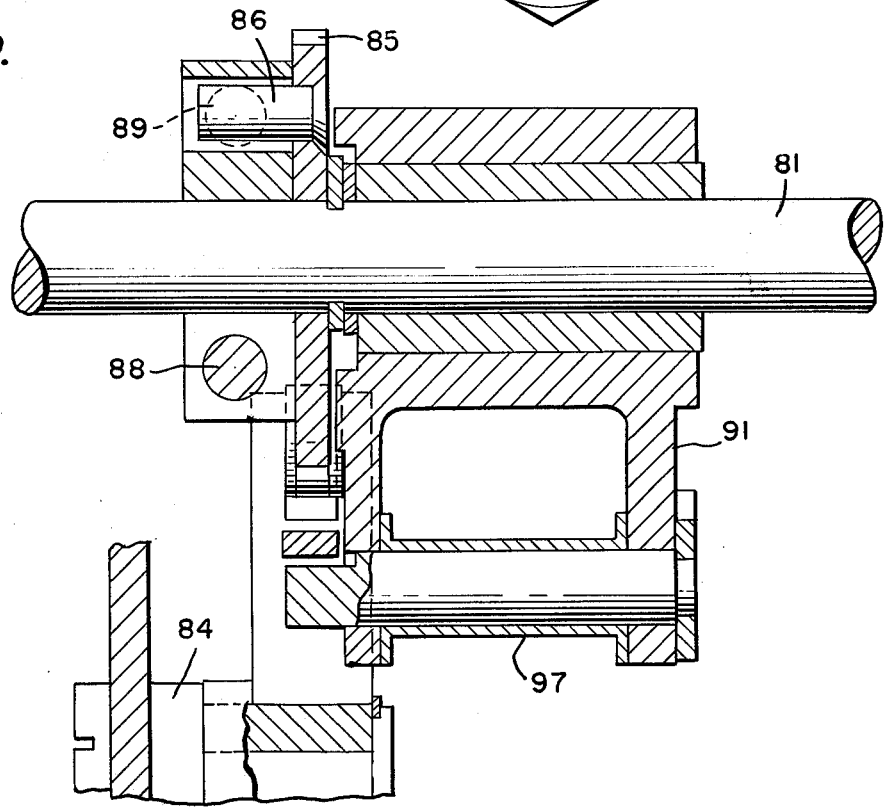

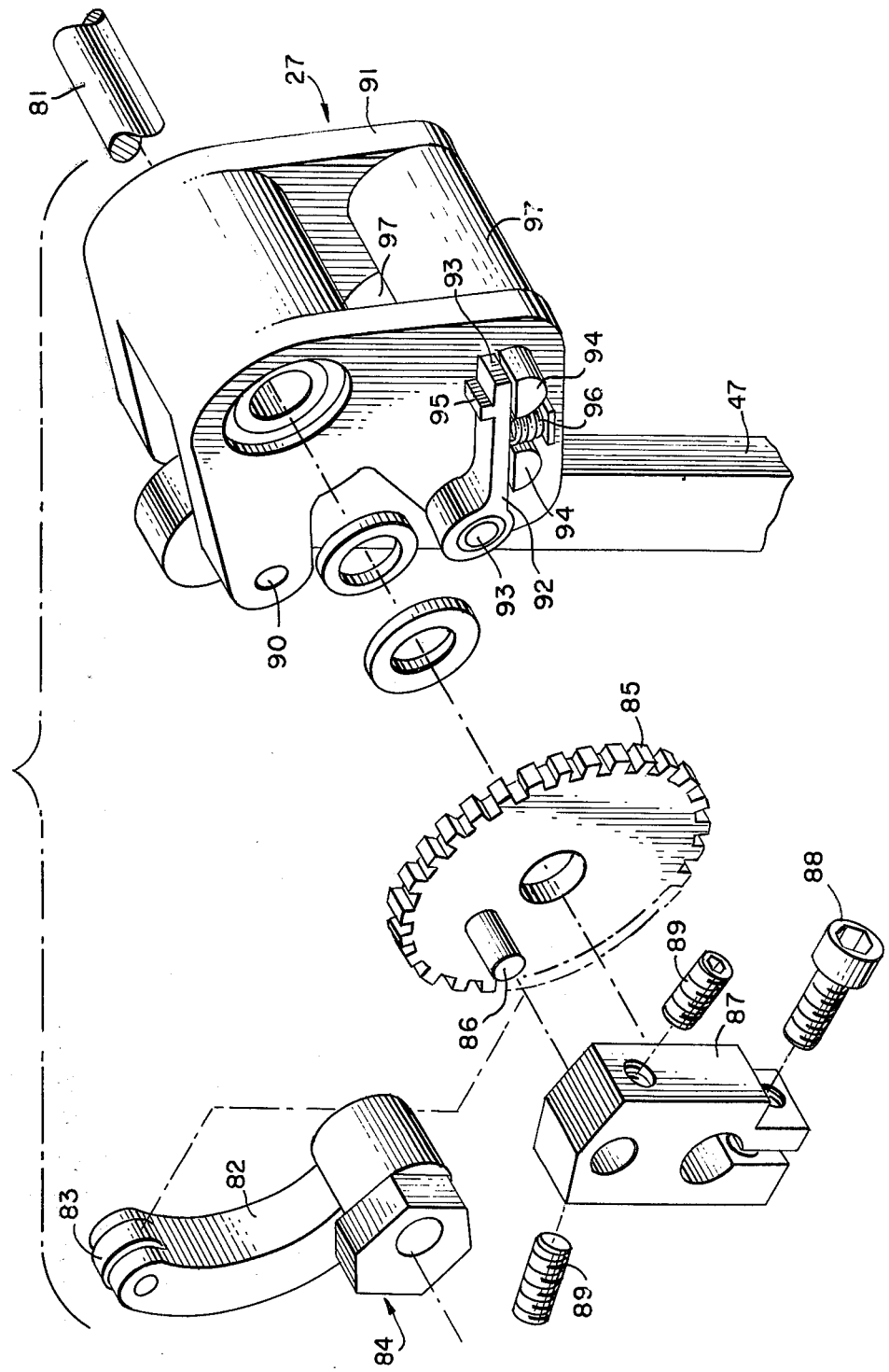

PAPER TAPE PUNCH AND READER

CROSS-REFERENCE TO RELATED APPLICATION

This invention is not disclosed in any co-pending application for a patent or any issued patent.

FIELD OF INVENTION

Coded paper tape has been used since approximately 1900 to electronically convey messages and to control the operation of numerous machines.

The most common paper tape today, containing eight code holes and a continuous line of transport holes is the ASCII tape. While it is anticipated that the current invention will have its principal application here, the invention is not so limited.

The punch and reader of this invention and certain machines of the prior art is further adapted to receive assynchronous signals and synchronously punch and read the paper tape.

DESCRIPTION OF PRIOR ART

The most widely used punches and readers today are the Models 32 and 33 ASR units manufactured by the Teletype Corporation, and introduced about 1960. These machines operate at a rate of ten characters per second.

Another widely used punch and reader is manufactured by the Litton Corporation and operates up to 60 characters per second.

SUMMARY OF THE INVENTION

This invention greatly simplifies the mechanisms of paper tape punches and readers and thereby improves the reliability and reduces the initial cost and further reduces the service cost of paper tape punches and readers. As indicated above, these machines have operating specifications controlled by industry wide standards and therefore operational differences are neither desired nor permitted.

The first improvement is the bi-directional stepping mechanism. The arrangement of the oscillating pawl minimizes the inertia and reduces the number of parts. The same mechanism is used for tape transport in either direction.

The second improvement is the punch interposer armature geometry which acts as a mechanical memory minimizing energy consumption. This new interposer design both drives the punch into the paper tape and withdraws the punch from the paper tape. The design allows the bail to merely pivot instead of sliding. Furthermore, the design allows for easy removal of the punch and die assembly.

The third improvement is the combination of the paper tape punch and reader which uses a single motor and timing signal, eliminating the cost of duplicate mechanisms.

DESCRIPTION OF DRAWINGS

FIG. 8 is a side view of the tape transport for the punch or reader.

FIG. 9 is a sectional view of the transport taken on lines 9—9 of FIG. 8.

FIG. 10 is an exploded schematic view of the punch or reader transport.

STRUCTURE OF DISCLOSED EMBODIMENT

Figure 1:
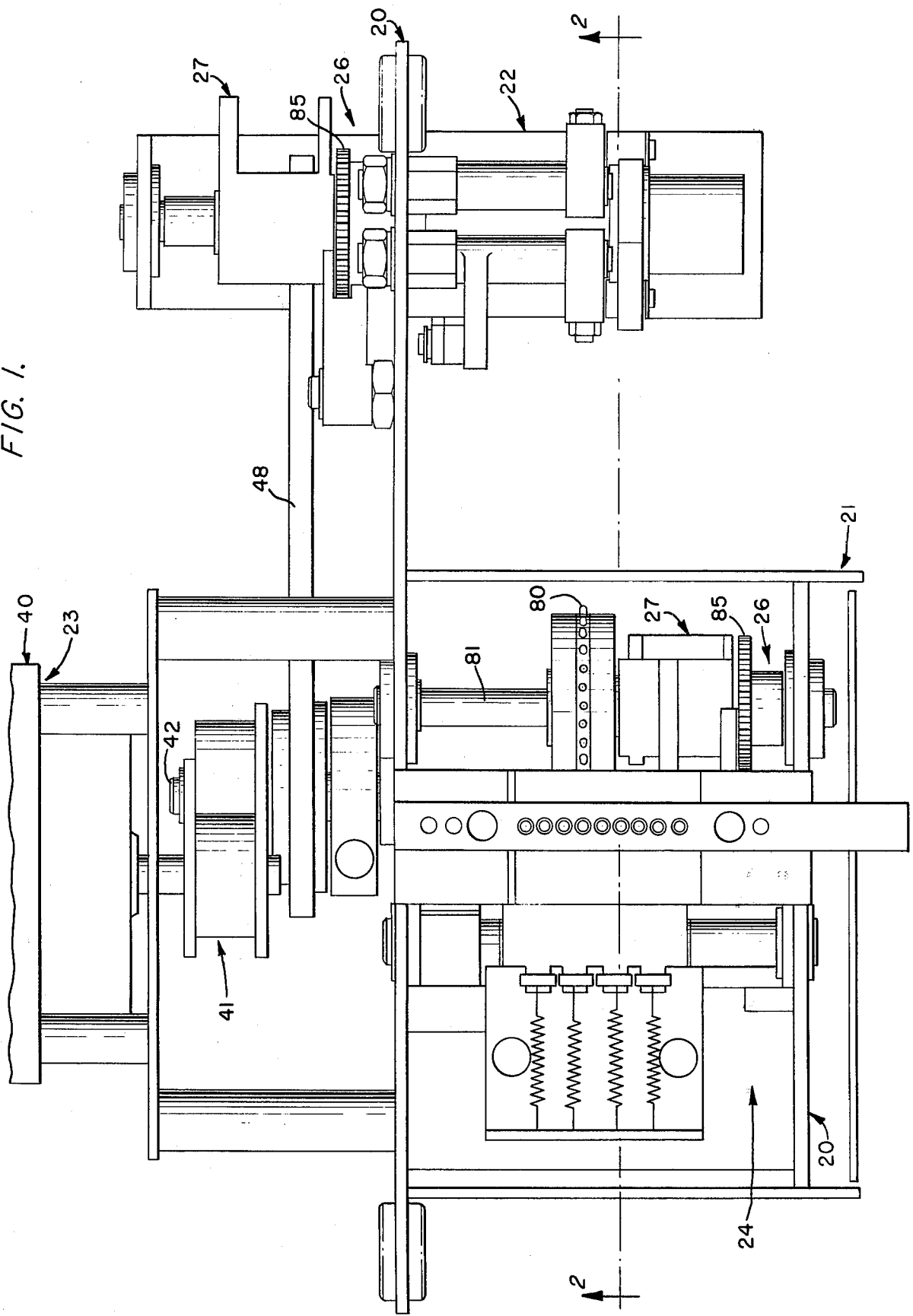
FIG. 1 is a plan view of the punch and reader.

The paper tape punch and reader has seven principal assemblies. Mounted on the housing 20 is the punch assembly 21, the reader assembly 22, the drive or power assembly 23, the punch magnet assembly 24, the punch interposer assembly 25, a pair of transport assemblies 26 and rocker assemblies 27, one of each associated with the punch assembly and the other of each associated with the reader assembly.

Figure 2:
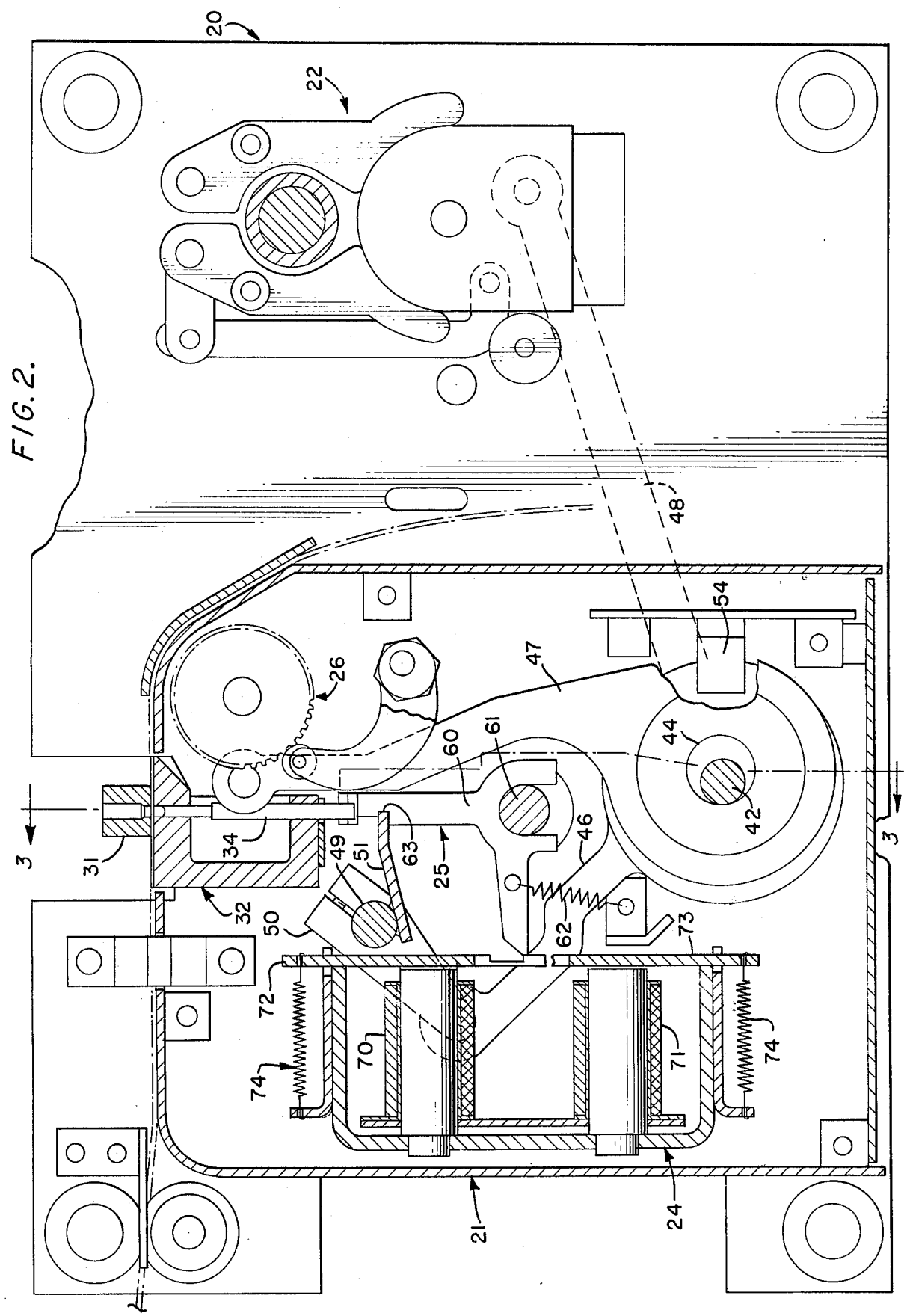
FIG. 2 is a vertical sectional view taken on lines 2—2 of FIG. 1.
Figure 3:
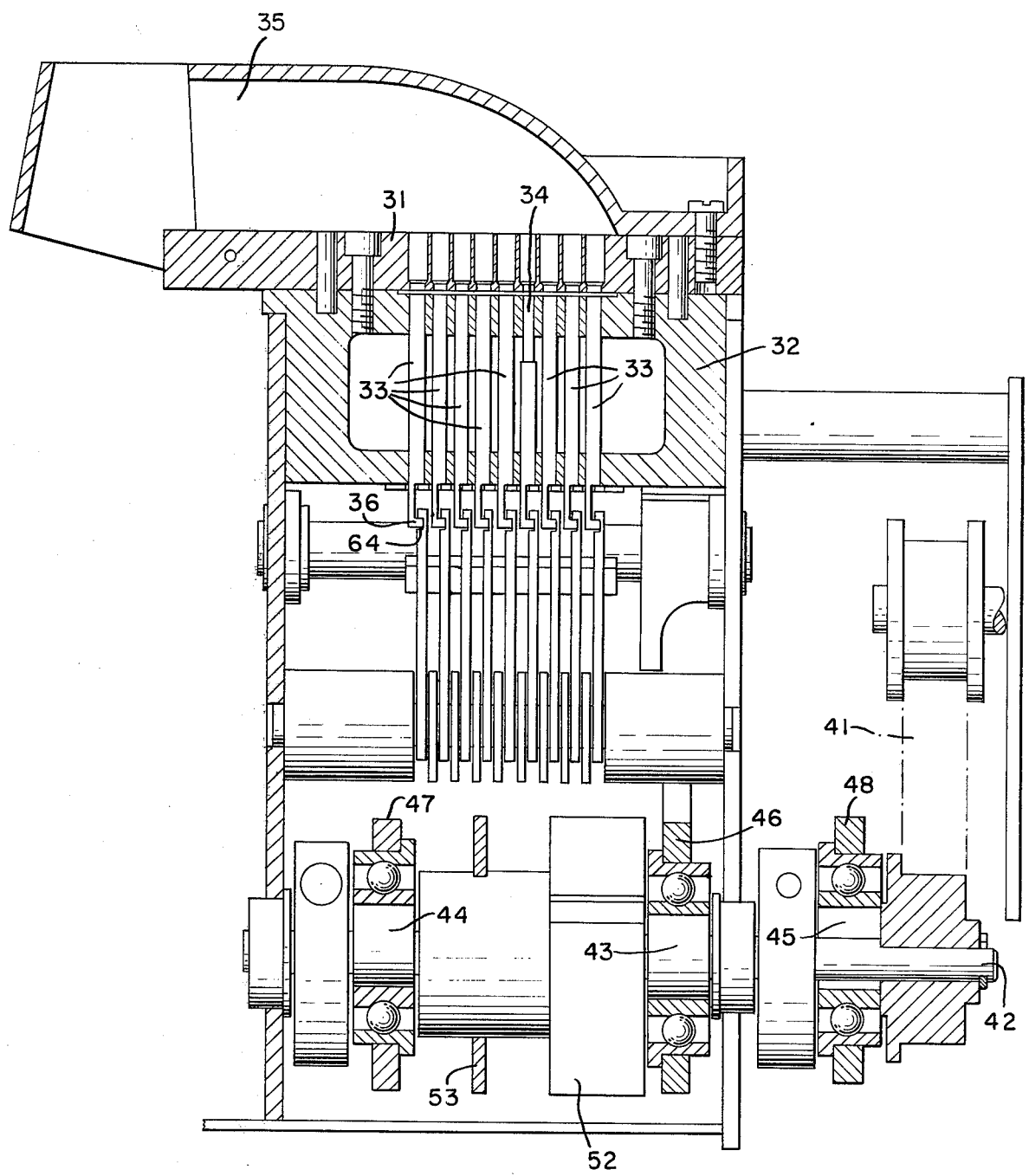
FIG. 3 is a vertical transverse sectional view of the punch mechanism taken on lines 3—3 of FIG. 2.

The punch assembly 21, as best shown in FIGS. 2 and 3, consists of a conventional die block 31, punch guide block 32 containing the conventionally spaced and sized set of eight code punch pins 33 and one transport punch pin 34. A conventional chute 35 is shown for removing the punched paper chad.

As best shown in FIG. 3, at the bottom of each of the punch pins 33 and 34 is a finger 36 cooperating with the interposer punch pin notch 64.

The reader assembly 22 is, with one exception, conventional and will therefore not further be described in this application. That exception is the tape transport assembly 26 and rocker assembly 27 whose counterpart is described in connection with the punch assembly below.

The drive assembly 23 comprises the conventional electric motor 40 and belt drive 41 operating the main drive shaft 42. Three eccentrics are mounted on the main drive shaft. At the left, as shown in FIG. 3, is punch tape transport eccentric 44, in the center is punch bail eccentric 43 and on the right is reader tape transport eccentric 45.

As most clearly shown in FIG. 2, the eccentrics cause movement of punch tape transport connecting rod or link 47, and mounted behind that, punch bail connecting link 46 and mounted behind that reader tape transport connecting link 48.

The punch bail connecting link 46 causes the punch bail crank arm 50 to rotate around bail shaft 49, thus reciprocating the end of punch bail 51 in a continuous oscillating motion.

The drive shaft also has attached to it a conventional flywheel 52 and a shutter 53 co-operating with an opto-electronic transducer 54.

Figure 4:
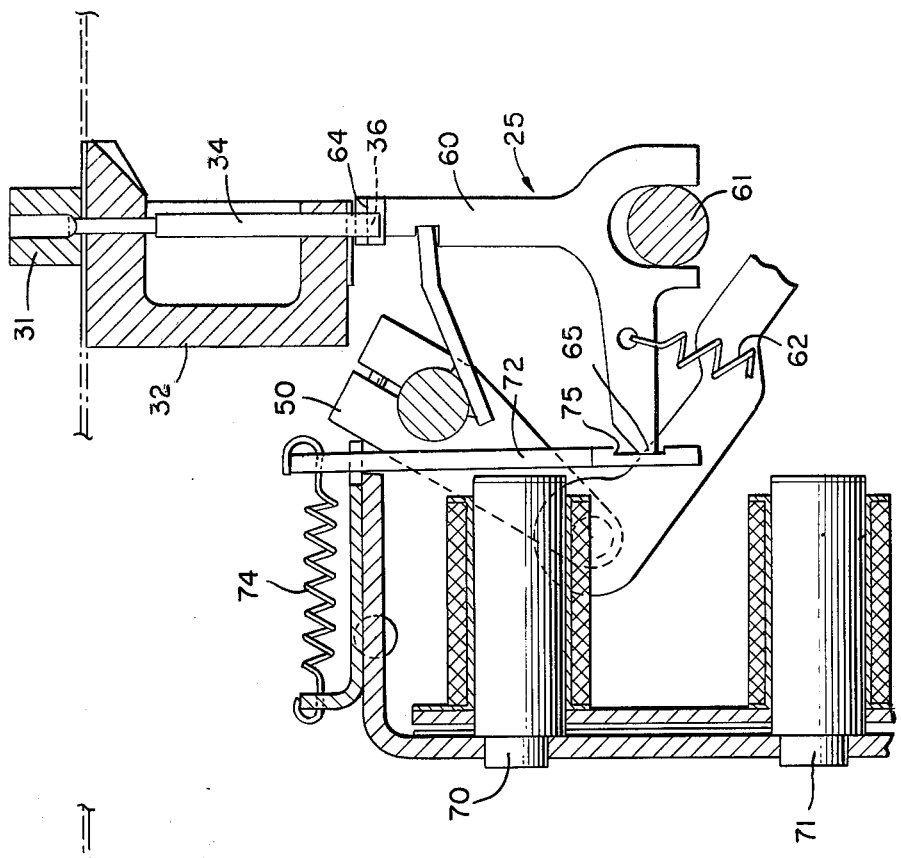
FIG. 4 is a fragmentary side view of the magnet, interposer and punch shown in FIG. 2 with the punch withdrawn and the interposer engaged with the bail shaft which is in the lowered position.
Figure 5:
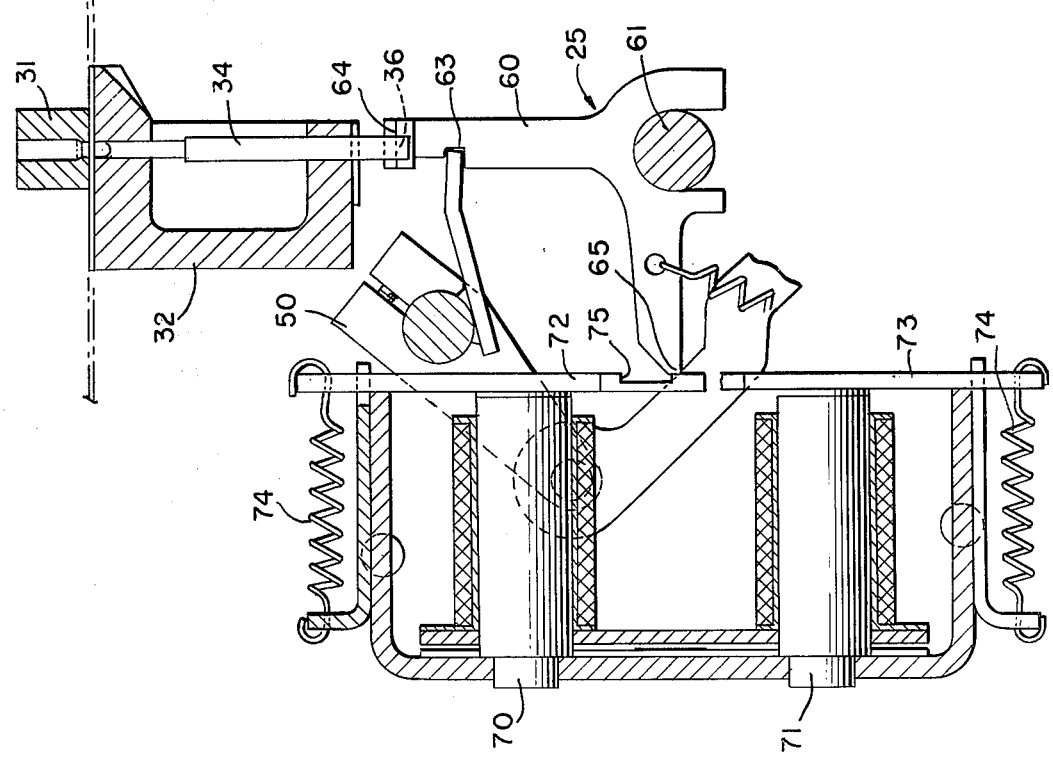
FIG. 5 is the same view as FIG. 4 except that the interposer and punch has been raised by the bail shaft to punch the paper tape.
Figure 6:
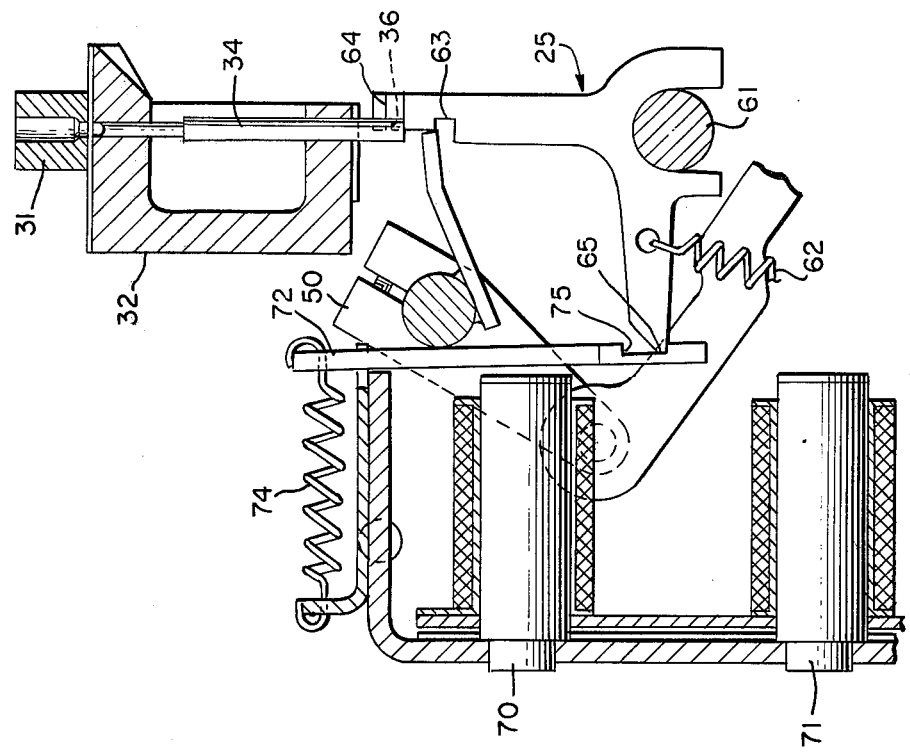
FIG. 6 is the same view as FIG. 5 except the punch and interposer have been withdrawn by the lowered bail shaft and the interposer has then been tilted out of engagement with the bail shaft.
Figure 7:
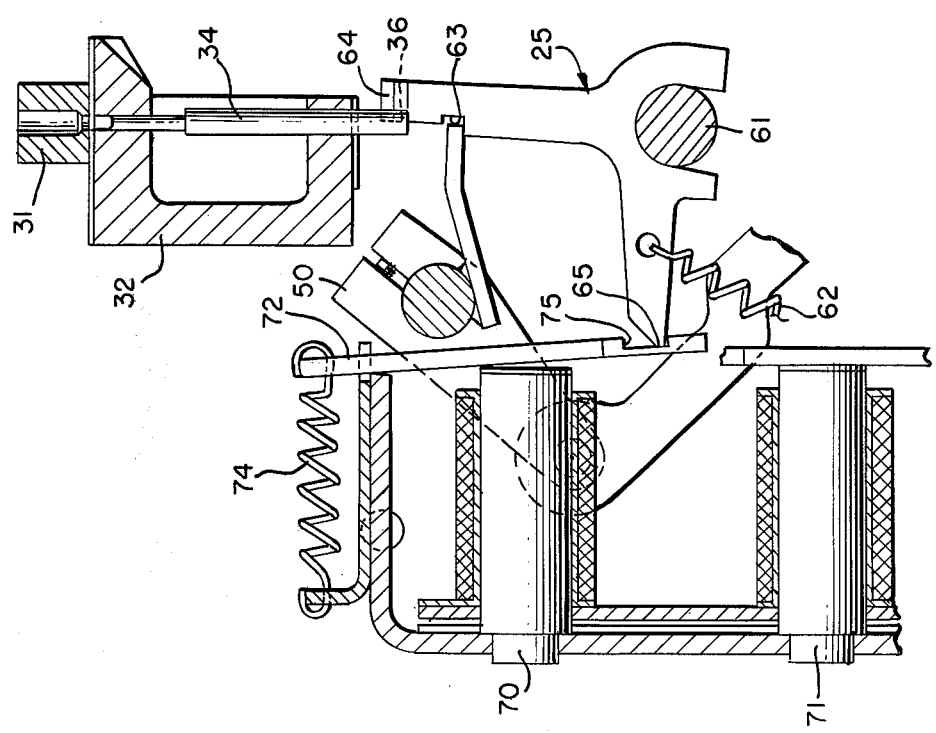
FIG. 7 is the same view as FIG. 6 except the bail shaft has risen without contacting the interposer, which holds the punch in the withdrawn position.

The punch interposer assembly 25 includes a set of nine spaced punch interposers 60, each engaging with one of the eight code punch pins 33 and single transport punch pin 34. Each of the interposers rests on and rotates on a common interposer shaft 61. Each interposer 60 is biased in a counterclockwise direction by its associated interposer spring 62. The interposer is prevented from further counterclockwise movement by contacting either the bail 51 in its interposer notch 63 as shown in FIG. 2, 4 and 5 or by interposer finger 65 contacting the lower edge of armature slot 75 as shown in FIGS. 6 and 7.

The punch magnet assembly 24 comprises a set of four upper magnets 70 and five lower magnets 71. Associated with the magnets are a set of four upper armatures 72 and a set of five lower armatures 73. The upper magnet armatures 72 are biased counterclockwise by the upper set of armature return springs 74 and the lower magnet armature 73 are biased clockwise by the lower set of armature return springs 74. The movement of the armatures are limited by contact with interposer fingers 65 associated with each armature. Each of the magnets is selectively energized to cause the associated punch pin to operate during the following cycle of the punch.

Each of the tape transport assemblies 26 are identical, although mounted on opposite sides of the punch and the reader as shown in FIG. 1. A sprocket wheel 80 engages the tape, indexing the tape over the linear distance of one hole spacing.

The sprocket is mounted on and rotationally controlled by sprocket shaft 81. Rocker frame 91 is freely journaled on sprocket shaft 81, as is square tooth wheel 85. Rotation of shaft 81 is caused by, in turn, oscillation rocker frame 91, selective de-energization of pawl 92 engaging square tooth wheel 85 which is fixed to shaft clamp 87. Shaft clamp 87 is mounted on the sprocket shaft by screw 88 and its angular position is adjusted by stub 86 of square tooth wheel 85 fitting in its enlarged upper aperture, and being positioned by adjusting screws 89.

Square tooth wheel 85 is held in position by detent arm 82 and detent roller 83 whose position over one index width can be adjusted by detent eccentric 84.

The rocker assembly 27 includes rocker pivot 90 attached to connecting link 47 or 48, and causing the rocker frame 91 to reciprocate angularly around sprocket shaft 81.

Mounted on the rocker frame are a pair of coils 97, coil posts 94, a pawl pivot post 93, on which is mounted the transport pawl 92, which is the armature for coils 97. The transport pawl contains a drive tooth 95 co-operating with the indentations or notches of square tooth wheel 85. The transport pawl is biased away from the coil posts by pawl spring 96.

MODE OF OPERATION

The conventional code signal for the eight hole paper tape is a string of electrical pulses creating a potential 256 element code. These signals are received assynchronously or randomly and are punched synchronously. The reader may operate independently of the punch.

A typical application is for a manually operated keyboard to operate the punch, relatively slowly and irregularly. At selected times, the reader will operate to rapidly transmit a length of the tape which has been punched.

The electric motor 40 runs continuously during operation, rotating drive shaft 42 by belt 41. The drive shaft turns eccentrics 44, 43 and 45, thus continuously reciprocating punch tape transport link 47, punch bail link 46, and reader transport link 48.

A fly wheel 52 provides mass to minimize the transient shock loads caused by the intermittent operation of the punches and the tape transports.

The electro-optical transducer 54 and shutter 53 provide a timing signal which goes on at 0° and off at 180° of each cycle to control the various functions.

An incoming punch signal is initially stored in a buffer which is read once each cycle. A machine designed to respond to incoming signals of up to 30 cycles per second will operate at 33 cycles to eventually unload the buffer.

FIG. 4 shows the bail 51 at the bottom of its stroke and armature 72 energized or withdrawn from interposer finger 65. The interposer as shown has rotated under influence of spring 62 counterclockwise to allow interposer notch 63 to engage the tip of the bail 51.

In FIG. 5, the bail 51 has driven interposer 60 upward, driving the punch pin into the paper tape. The magnet 70 has meanwhile de-energized, allowing the armature 72 to rotate counterclockwise. The tip of interposer finger 65 has slid upwardly in armature slot 75.

FIG. 6 illustrates the condition where the shown punch should not operate during the next cycle. The magnet continues to be de-energized and the armature is biased counterclockwise as shown in FIG. 5. The bail 51 as shown in FIG. 6 has moved to its downward position, pushing down the interposer 60 and withdrawing punch pin 34 from the paper tape. At the same time, the interposer is rocked clockwise by the engagement of interposer finger 65 against the lower edge of armature slot 75.

FIG. 7 shows the quiescent state of the armature 72, interposer 60 and punch pin 34 as the bail freely oscillates upwardly, missing the interposer.

The signal to any magnet need be only large enough to rotate its armature against its biasing spring. The signal need be only long enough to allow the interposer finger 65 to clear the bottom edge of slot 75. Specifically, the magnet need not be energized during any portion of the upward bail shaft movement during a punching operation. I term this feature a mechanical memory. It serves to substantially reduce the power requirement thus reducing the size of electronic components and cost of the machine.

During penetration of the punch pins, the tape must be held stationary and must index one space during the period the punches are in their withdrawn position.

The tape is held stationary by detent roller 83 which is spring loaded against square tooth wheel 85. Since the standard specifications for the distances between the rows of holes is very precise, a fine adjustment is provided. The movement of square tooth wheel 85 is governed by the rotation of the rocker frame 91. Adjustment between square tooth wheel 85 and sprocket shaft 81 is therefore provided. Shaft clamp 87 is journaled on both sprocket shaft 81 and stub 86 of wheel 85. Screw 88 is tightened and the angular position of sprocket shaft 81 is adjusted by the setting of adjusting screws 89 in the enlarged aperture of shaft 87 clamp which loosely fits around stub 86.

Prior to the above adjustment, the position of detent roller 83 is adjusted. Detent eccentric 84 is conventional and allows adjustment of arm 82. A spring, not shown, biases arm 82 against square tooth wheel 85.

The tape transport cycle is controlled by the rocker assembly and ultimately by the tape transport eccentric 44 which is positioned relative to the punch bail eccentric 43 so that the rocker motion is offset one quarter cycle, to move the tape forward during the withdrawn half of the punch cycle. As rocker frame approaches one limit, the current in coils 97 is turned off, allowing pawl 92 to rotate, inserting tooth 95 into the associated indentation or notch of square tooth wheel 85. At the end of the cycle, the tooth is withdrawn and the wheel is held in position by detent roller 83.

The reverse stepping of the tape is accomplished by having the tooth engage during the opposite travel of rocker frame 91. This occurs during the portion of the cycle the punching would normally be extended and are of course all withdrawn by the above-described armatures holding the interposers out of engagement.

The positioning of coils 97 as shown is unusual. The plane of rotation of the pawl 92 is normal to the axis of the coils. This allows the required magnetic flux to be generated while bringing the mass of the coils nearer the center of rotation, thus reducing the moment of inertia, force required, and vibrations generated during operation of the rocker assembly.

Although the present invention has been described with reference to a particular embodiment thereof, it should be understood that those skilled in the art may make many other modifications and embodiments thereof which will fall within the spirit and scope of the principles of this invention.

What is claimed as new and desired to be secured by patent of the United States is:

1. A paper tape transport for transforming continuous rotary motion of a drive shaft into selectively intermittent sinusoidal bi-directional movement of the paper tape comprising:
    (a) a continuously reciprocating driving link;
    (b) a continuously oscillating assembly driven by said link over an arc equivalent to the linear hole spacing on the paper tape;
    (c) a selectively energizable magnet mounted on said oscillating assembly;
    (d) a pawl mounted on the oscillating assembly and controlled by said magnet, the pawl containing a driving tooth;
    (e) a bi-directional driving wheel engageable with said tooth;
    (f) a tape transport sprocket operatively connected to said driving wheel and engaging said paper tape; and
    (g) means to restrain movement of said sprocket when no signal is received by said magnet to engage said tooth of said armature.

2. The paper tape transport of claim 1 in which the bi-directional driving wheel is a square tooth wheel.

3. The paper tape transport of claim 1 in which the plane of rotation of the pawl is normal to the axis of the magnet coil.

* * * * *